(12) United States Patent
Cordeiro et al.

(10) Patent No.: US 9,417,739 B2
(45) Date of Patent: Aug. 16, 2016

(54) HIGH SPEED MULTI-TOUCH TOUCH DEVICE AND CONTROLLER THEREFOR

(75) Inventors: Craig A. Cordeiro, Westford, MA (US); Thomas J. Rebeschi, Merrimack, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 1048 days.

(21) Appl. No.: 12/786,920

(22) Filed: May 25, 2010

(65) Prior Publication Data

US 2010/0300773 A1 Dec. 2, 2010

Related U.S. Application Data

(60) Provisional application No. 61/182,366, filed on May 29, 2009, provisional application No. 61/231,471, filed on Aug. 5, 2009.

(51) Int. Cl.
*G06F 3/044* (2006.01)
(52) U.S. Cl.
CPC ...................................... *G06F 3/044* (2013.01)
(58) Field of Classification Search
USPC ...................... 345/173–175; 178/18.01–19.04
IPC .............................................. G06F 3/041,3/044
See application file for complete search history.

(56) References Cited

U.S. PATENT DOCUMENTS

| 3,732,369 | A | 5/1973 | Cotter |
| 4,071,691 | A | 1/1978 | Pepper, Jr. |
| 4,175,239 | A | 11/1979 | Sandler |
| 4,323,829 | A | 4/1982 | Witney et al. |
| 4,581,483 | A | 4/1986 | Ralston |
| 4,639,720 | A | 1/1987 | Rympalski et al. |
| 4,686,332 | A | 8/1987 | Greanias et al. |
| 5,006,952 | A | 4/1991 | Thomas |
| 5,063,306 | A * | 11/1991 | Edwards .............. H03K 17/955 327/517 |
| 5,189,417 | A * | 2/1993 | Caldwell et al. ................ 341/26 |
| 5,305,017 | A | 4/1994 | Gerpheide |

(Continued)

FOREIGN PATENT DOCUMENTS

| EP | 178157 | 4/1986 |
| FR | 2774497 | 8/1999 |

(Continued)

OTHER PUBLICATIONS

Analog Devices AD7142/AD7142-1, Rev. PrD, "Programmable Capicatance-to-Digital Converter with Environmental Compensation", 2005 Analog Devices, Inc., pp. 1-64.

(Continued)

*Primary Examiner* — Kenneth Bukowski
(74) *Attorney, Agent, or Firm* — Robert S. Moshrezadeh

(57) ABSTRACT

A touch-sensitive device includes a touch panel, a drive unit, a sense unit, and a measurement unit. A touch applied to a node of the panel changes a capacitive coupling between two electrodes (a drive electrode and a sense electrode) of the touch panel. The drive unit delivers a drive signal, which may comprise one or more drive pulses, to the drive electrode. The sense unit couples to the sense electrode, and generates a response signal that includes a differentiated representation of the drive signal. The amplitude of the response signal is responsive to the capacitive coupling between the electrodes, and is measured to provide an indication of a touch at the node.

19 Claims, 10 Drawing Sheets

(56) References Cited

U.S. PATENT DOCUMENTS

| | | | |
|---|---|---|---|
| 5,349,353 A | 9/1994 | Zrilic | |
| 5,374,787 A | 12/1994 | Miller et al. | |
| 5,392,058 A * | 2/1995 | Tagawa | 345/104 |
| 5,488,204 A | 1/1996 | Mead et al. | |
| 5,526,294 A | 6/1996 | Ono | |
| 5,572,205 A | 11/1996 | Caldwell et al. | |
| 5,730,165 A | 3/1998 | Philipp | |
| 5,790,106 A | 8/1998 | Hirano et al. | |
| 5,790,107 A | 8/1998 | Kasser | |
| 5,825,352 A * | 10/1998 | Bisset et al. | 345/173 |
| 5,861,583 A | 1/1999 | Schediwy et al. | |
| 5,867,111 A | 2/1999 | Caldwell et al. | |
| 5,920,309 A | 7/1999 | Bisset et al. | |
| 6,075,520 A | 6/2000 | Inoue et al. | |
| 6,106,481 A * | 8/2000 | Cohen | 600/534 |
| 6,239,389 B1 | 5/2001 | Allen et al. | |
| 6,452,514 B1 | 9/2002 | Philipp | |
| 6,466,036 B1 | 10/2002 | Philipp | |
| 6,535,200 B2 | 3/2003 | Philipp | |
| 6,879,930 B2 | 4/2005 | Sinclair | |
| 6,885,365 B1 | 4/2005 | Kang | |
| 6,888,536 B2 | 5/2005 | Westerman | |
| 6,970,160 B2 | 11/2005 | Mulligan et al. | |
| 7,129,714 B2 | 10/2006 | Baxter | |
| 7,148,704 B2 | 12/2006 | Philipp | |
| 7,265,746 B2 | 9/2007 | Knowles | |
| 7,274,353 B2 | 9/2007 | Chiu et al. | |
| 7,292,229 B2 | 11/2007 | Morag et al. | |
| 7,453,444 B2 | 11/2008 | Geaghan | |
| 7,812,827 B2 * | 10/2010 | Hotelling et al. | 345/173 |
| 7,830,157 B2 | 11/2010 | Geaghan | |
| 8,077,161 B2 | 12/2011 | Kinoshita | |
| 8,605,051 B2 | 12/2013 | Hotelling et al. | |
| 2001/0006369 A1 | 7/2001 | Ely | |
| 2003/0076306 A1 | 4/2003 | Zadesky et al. | |
| 2003/0122432 A1 | 7/2003 | Caldwell | |
| 2004/0004488 A1 | 1/2004 | Baxter | |
| 2004/0119701 A1 | 6/2004 | Mulligan et al. | |
| 2004/0178997 A1 | 9/2004 | Gillespie et al. | |
| 2005/0150697 A1 | 7/2005 | Altman et al. | |
| 2006/0012581 A1 | 1/2006 | Haim | |
| 2006/0022959 A1 | 2/2006 | Geaghan | |
| 2006/0092142 A1 | 5/2006 | Gillespie et al. | |
| 2006/0097991 A1 | 5/2006 | Hotelling et al. | |
| 2006/0232567 A1 | 10/2006 | Westerman et al. | |
| 2007/0074913 A1 | 4/2007 | Geaghan et al. | |
| 2007/0074915 A1 | 4/2007 | Chung et al. | |
| 2007/0084645 A1 | 4/2007 | Chung et al. | |
| 2007/0247172 A1 | 10/2007 | Li | |
| 2007/0257890 A1 | 11/2007 | Hotelling et al. | |
| 2007/0268272 A1 | 11/2007 | Perski et al. | |
| 2007/0285365 A1 | 12/2007 | Lee | |
| 2008/0004505 A1 | 1/2008 | Kapit et al. | |
| 2008/0006453 A1 | 1/2008 | Hotelling | |
| 2008/0078590 A1 | 4/2008 | Sequine | |
| 2008/0087477 A1 | 4/2008 | Cho et al. | |
| 2008/0106520 A1 | 5/2008 | Free et al. | |
| 2008/0142281 A1 | 6/2008 | Geaghan | |
| 2008/0158167 A1 | 7/2008 | Hotelling et al. | |
| 2008/0158169 A1 | 7/2008 | O'Connor et al. | |
| 2008/0158175 A1 | 7/2008 | Hotelling | |
| 2008/0162996 A1 | 7/2008 | Krah et al. | |
| 2008/0162997 A1 | 7/2008 | Vu et al. | |
| 2008/0165134 A1 | 7/2008 | Krah | |
| 2008/0251299 A1 * | 10/2008 | Liao et al. | 178/18.06 |
| 2008/0309625 A1 | 12/2008 | Krah et al. | |
| 2009/0009483 A1 | 1/2009 | Hotelling et al. | |
| 2009/0025987 A1 | 1/2009 | Perski | |
| 2009/0066670 A1 | 3/2009 | Hotelling et al. | |
| 2009/0096757 A1 | 4/2009 | Hotelling et al. | |
| 2009/0096758 A1 * | 4/2009 | Hotelling et al. | 345/173 |
| 2009/0194344 A1 | 8/2009 | Harley et al. | |
| 2009/0219258 A1 | 9/2009 | Geaghan et al. | |
| 2009/0244033 A1 | 10/2009 | Westerman | |
| 2009/0284495 A1 | 11/2009 | Geaghan et al. | |
| 2010/0033437 A1 | 2/2010 | Matsubara | |
| 2010/0073323 A1 | 3/2010 | Geaghan | |
| 2010/0110037 A1 * | 5/2010 | Huang et al. | 345/174 |
| 2010/0149110 A1 | 6/2010 | Gray | |
| 2010/0188345 A1 | 7/2010 | Keskin | |
| 2011/0007021 A1 | 1/2011 | Bernstein | |
| 2011/0122087 A1 * | 5/2011 | Jang | G06F 3/044 345/174 |
| 2011/0157080 A1 | 6/2011 | Ciesla | |
| 2012/0050207 A1 * | 3/2012 | Westhues | G06F 3/03545 345/174 |

FOREIGN PATENT DOCUMENTS

| | | |
|---|---|---|
| GB | 2072389 | 9/1981 |
| GB | 2 286 247 | 8/1995 |
| JP | 2288122 | 11/1990 |
| JP | H06-162888 | 6/1994 |
| JP | H 08-016307 | 1/1996 |
| JP | 11305932 | 11/1999 |
| JP | 2000/076014 | 3/2000 |
| JP | 2007/052639 | 3/2007 |
| JP | 2007-334690 | 12/2007 |
| JP | 2009-110418 | 5/2009 |
| JP | 2009/192308 | 8/2009 |
| KR | 10-0453971 | 10/2004 |
| WO | WO 2004/019258 A2 | 3/2004 |
| WO | WO 2004/040606 A2 | 5/2004 |
| WO | WO 2006/104745 A2 | 10/2006 |
| WO | WO 2007/017848 A2 | 2/2007 |
| WO | WO 2008/085720 A1 | 7/2008 |

OTHER PUBLICATIONS

Bao et al.; "DOA Estimation Under Unknown Mutual Coupling And Multipath", IEEE Transactions on Aerospace and Electronic Systems IEEE USA, vol. 41, No. 2, Apr. 2005, pp. 565-573.

Geaghan et al., "Low Cost Mutual Capacitance Measuring Circuits and Methods", Presented at SID Conference, Austin, TX, Jun. 3, 2009, 4 pages.

International Search Report, PCT/US2010/036030, International Filing Date: May 25, 2010, 6 pages.

"Operational_Transconductance_Amplifier", Creative Commons Attribution-ShareALike [On-line], [ updated on the internet Apr. 15, 2010], URL<http://en.wikipedia.org/wiki/Operational_transconductance_amplifier>.

QMatrix Data Sheet, Mutual Capacitance QT60486_104, 2003, Quantum Research Group, Ltd., pp. 1-30.

SID Conference Presentation, "Low Cost Mutual Capacitance Measuring Circuit", 3M Touch Systems, San Antonio, Texas, 9 pages, © 2009.

U.S. Appl. No. 12/575,860, "Multi-touch Touch Device with Multiple Drive Frequencies and Maximum Likelihood Estimation", filed Oct. 8, 2009.

U.S. Appl. No. 12/618,874, "Touch Sensitive Device Using Threshold Voltage Signal", filed Nov. 16, 2009.

U.S. Appl. No. 12/652,343, "High Speed Noise Tolerant Multi-touch Touch Device and Controller Therefor", filed Jan. 5, 2010.

U.S. Appl. No. 61/348,173, "High Speed Low Power Multi-touch Touch Device and Controller Therefor", filed May 25, 2010

Written Opinion, for International Application PCT/US2010/036030, 6 pages.

* cited by examiner

HIGH SPEED MULTI-TOUCH TOUCH DEVICE AND CONTROLLER THEREFOR

CROSS REFERENCE TO RELATED APPLICATION

This application claims the benefit of U.S. Provisional patent application No. 61/182,366, filed May 29, 2009, and U.S. Provisional patent application No. 61/231,471, filed Aug. 5, 2009, the disclosure of which is incorporated by reference herein in its entirety.

FIELD OF THE INVENTION

This invention relates generally to touch-sensitive devices, particularly those that rely on a capacitive coupling between a user's finger or other touch implement and the touch device, with particular application to such devices that are capable of detecting multiple touches applied to different portions of the touch device at the same time.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

There are two known techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

Within the context of the second technique, various additional techniques have been used to measure the mutual capacitance between electrodes. In one such technique, a capacitor coupled to a receiver electrode is used to accumulate multiple charges associated with multiple pulses of a drive signal. Each pulse of the drive signal thus contributes only a small portion of the total charge built up on this "integrating capacitor". Reference is made to U.S. Pat. No. 6,452,514 (Philipp). This technique has good noise immunity, but its speed may be limited depending upon the number of pulses needed to charge the integrating capacitor.

BRIEF SUMMARY

The present application discloses, inter alia, touch-sensitive devices capable of detecting multiple touches applied to different portions of the touch device at the same time or at overlapping times. Moreover, the touch devices need not employ an integrating capacitor in order to measure the capacitive coupling between the drive electrodes and the receive electrodes. Rather, in at least some embodiments, a single pulse from a drive signal may be all that is necessary to measure the capacitive coupling between a particular drive electrode and a particular receive electrode, or even between a particular drive electrode and a large plurality of (e.g. all of the) receive electrodes. To accomplish this, assuming a suitable pulse shape is used for the drive signal, differentiation circuits are preferably coupled to the receive electrodes so that a differentiated representation of the drive signal, referred to as a response signal, is generated for each receive electrode. In an exemplary embodiment, each differentiation circuit may comprise an operational amplifier (op amp) with a feedback resistor connected between an inverting input of the op amp and the output of the op amp, with the inverting input also being connected to a given receive electrode. Other known differentiation circuit designs can also be used, so long as the circuit provides an output that includes in some form at least an approximation of the derivative with respect to time of the drive signal.

A characteristic amplitude, such as a peak amplitude or average amplitude, of the response signal is indicative of the capacitive coupling between the drive electrode and the receive electrode being sampled. A touch at the node corresponding to the particular drive and receive electrodes has the effect of reducing capacitive coupling and reducing the characteristic amplitude. Such a reduction in amplitude can be measured even with only a single pulse of the drive signal. Multiple touches at different portions of the touch device that are simultaneous or that otherwise overlap in time can be detected in this manner. If noise reduction is desired, a selected number of multiple pulses from a drive signal may be employed for each drive/receive electrode pair (i.e., node), and the amplitude measurements measured or otherwise processed to provide a lower noise measurement.

The application also discloses touch-sensitive apparatuses that include a touch panel, a drive unit, a sense unit, and a measurement unit. The panel may include a touch surface and a plurality of electrodes defining an electrode matrix, the plurality of electrodes including a plurality of drive electrodes and a plurality of receive electrodes. Each drive electrode is capacitively coupled to each receive electrode at a respective node of the matrix. The panel is configured such that a touch on the touch surface proximate a given one of the nodes changes a coupling capacitance between the drive electrode and the receive electrode associated with the given node. The drive unit, in turn, is configured to generate a drive signal and to deliver the drive signal to the drive electrodes one at a time, e.g. through a multiplexer. The drive signal may be or include only one individual drive pulse, or it may include a plurality or train of such drive pulses. The sense unit may be configured to generate, for each drive signal delivered to each drive electrode, response signals for the plurality of receive electrodes that are capacitively coupled to such drive electrode, each of the response signals including a differentiated representation of the drive signal. An amplitude of each of these response signals is responsive to the coupling capacitance at the associated node. Finally, the measurement unit is preferably configured to measure the amplitude of each of the response signals for each of the nodes, and to determine therefrom the positions of multiple temporally overlapping touches, if present, on the touch surface.

The shape of the drive pulse(s) used in the drive signal may be tailored or selected so as to provide a desired waveform shape for the response signals. For example, if a rectangle shape is used for the drive pulse, the response signal generated by the sense unit typically comprises a pair of opposite polarity impulse pulses, the peak amplitude of which can be isolated with a peak detector and optional sample/hold buffer. Alternatively, if a ramp-shaped drive pulse is selected, the response signal typically comprises a pulse shape that is nominally rectangular, i.e., it includes a relatively constant amplitude plateau disposed between two relatively steep high-to-low transitions, examples of which are described below. Such a rectangular-shaped response signal allows for the possible elimination of certain circuit elements, and overall simplification of the touch device, as described further below.

The application also discloses touch-sensitive apparatuses that include a touch panel, a drive unit, and a sense unit. The panel includes a touch surface and a plurality of electrodes defining an electrode matrix, the electrode matrix being configured such that a touch on the touch surface proximate a given node of the matrix changes a coupling capacitance between two of the electrodes. The drive unit is coupled to the electrode matrix and configured to generate a drive signal that includes one or more ramped pulses. The sense unit is also coupled to the electrode matrix, and is configured to generate, in response to the drive signal, at least one response signal that includes one or more rectangle pulses, an amplitude of the at least one response signal being responsive to a touch on the touch surface.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
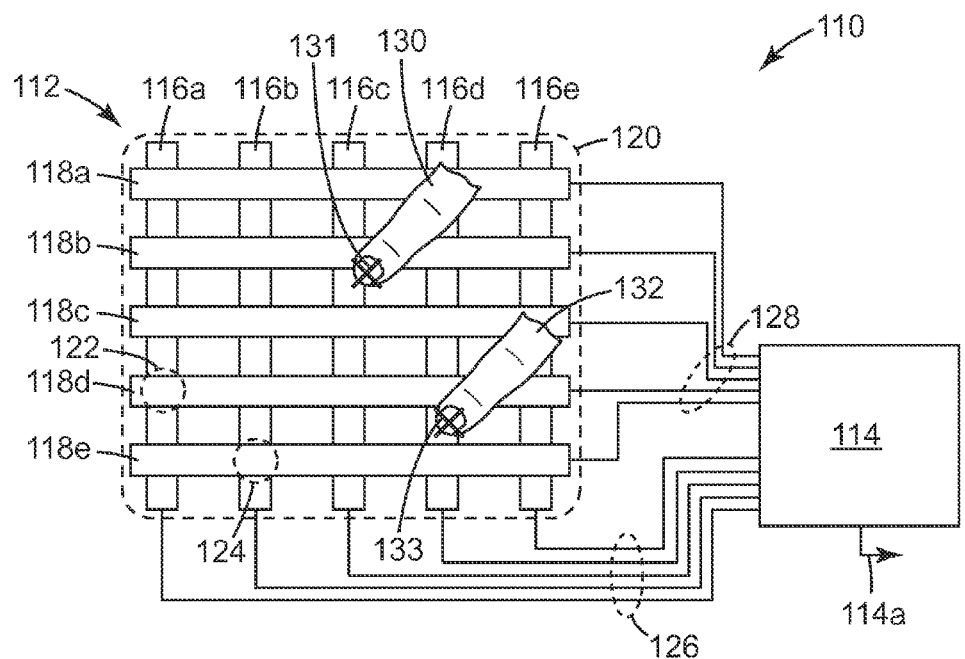
FIG. 1 is a schematic view of a touch device.

In FIG. 1, an exemplary touch device 110 is shown. The device 110 includes a touch panel 112 connected to electronic circuitry, which for simplicity is grouped together into a single schematic box labeled 114 and referred to collectively as a controller.

The touch panel 112 is shown as having a 5×5 matrix of column electrodes 116a-e and row electrodes 118a-e, but other numbers of electrodes and other matrix sizes can also be used. The panel 112 is typically substantially transparent so that the user is able to view an object, such as the pixilated display of a computer, hand-held device, mobile phone, or other peripheral device, through the panel 112. The boundary 120 represents the viewing area of the panel 112 and also preferably the viewing area of such a display, if used. The electrodes 116a-e, 118a-e are spatially distributed, from a plan view perspective, over the viewing area 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In exemplary embodiments the electrodes may be composed of indium tin oxide (ITO) or other suitable electrically conductive materials. From a depth perspective, the column electrodes may lie in a different plane than the row electrodes (from the perspective of FIG. 1, the column electrodes 116a-e lie underneath the row electrodes 118a-e) such that no significant ohmic contact is made between column and row electrodes, and so that the only significant electrical coupling between a given column electrode and a given row electrode is capacitive coupling. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch surface. Additionally, in display-type applications, a back shield may be placed between the display and the touch panel 112. Such a back shield typically consists of a conductive ITO coating on a glass or film, and can be grounded or driven with a waveform that reduces signal coupling into touch panel 112 from external electrical interference sources. Other approaches to back shielding are known in the art. In general, a back shield reduces noise sensed by touch panel 112, which in some embodiments may provide improved touch sensitivity (e.g., ability to sense a lighter touch) and faster response time. Back shields are sometimes used in conjunction with other noise reduction approaches, including spacing apart touch panel 112 and a display, as noise strength from LCD displays, for example, rapidly decreases over distance. In addition to these techniques, other approaches to dealing with noise problems are discussed in reference to various embodiments, below.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, any one of which can be addressed by controller 114 via appropriate selection of one of the control lines 126, which individually couple the respective column electrodes 116a-e to the controller, and appropriate selection of one of the control lines 128, which individually couple the respective row electrodes 118a-e to the controller.

When a finger 130 of a user or other touch implement comes into contact or near-contact with the touch surface of the device 110, as shown at touch location 131, the finger capacitively couples to the electrode matrix. The finger draws charge from the matrix, particularly from those electrodes lying closest to the touch location, and in doing so it changes the coupling capacitance between the electrodes corresponding to the nearest node(s). For example, the touch at touch location 131 lies nearest the node corresponding to electrodes 116c/118b. As described further below, this change in coupling capacitance can be detected by controller 114 and interpreted as a touch at or near the 116a/118b node. Preferably, the controller is configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a. The number of distinct simultaneous or temporally overlapping touches capable of being detected by controller 114 is preferably not limited to 2, e.g., it may be 3, 4, or more, depending on the size of the electrode matrix.

As discussed further below, the controller 114 preferably employs a variety of circuit modules and components that enable it to rapidly determine the coupling capacitance at some or all of the nodes of the electrode matrix. For example, the controller preferably includes at least one signal generator or drive unit. The drive unit delivers a drive signal to one set of electrodes, referred to as drive electrodes. In the embodiment of FIG. 1, the column electrodes 116a-e may be used as drive electrodes, or the row electrodes 118a-e may be so used. The drive signal is preferably delivered to one drive electrode at a time, e.g., in a scanned sequence from a first to a last drive electrode. As each such electrode is driven, the controller monitors the other set of electrodes, referred to as receive electrodes. The controller 114 may include one or more sense units coupled to all of the receive electrodes. For each drive signal that is delivered to each drive electrode, the sense unit(s) generate response signals for the plurality of receive electrodes. Preferably, the sense unit(s) are designed such that each response signal comprises a differentiated representation of the drive signal. For example, if the drive signal is represented by a function f(t), which may represent voltage as a function of time, then the response signal may be or comprise, at least approximately, a function g(t), where g(t)=d f(t)/dt. In other words, g(t) is the derivative with respect to time of the drive signal f(t). Depending on the design details of the circuitry used in the controller 114, the response signal may include: (1) g(t) alone; or (2) g(t) with a constant offset (g(t)+a); or (3) g(t) with a multiplicative scaling factor (b*g (t)), the scaling factor capable of being positive or negative, and capable of having a magnitude greater than 1, or less than 1 but greater than 0; or (4) combinations thereof, for example. In any case, an amplitude of the response signal is advantageously related to the coupling capacitance between the drive electrode being driven and the particular receive electrode being monitored. Of course, the amplitude of g(t) is also proportional to the amplitude of the original function f(t). Note that the amplitude of g(t) can be determined for a given node using only a single pulse of a drive signal, if desired.

The controller may also include circuitry to identify and isolate the amplitude of the response signal. Exemplary circuit devices for this purpose may include one or more peak detectors, sample/hold buffer, and/or low-pass filter, the selection of which may depend on the nature of the drive signal and the corresponding response signal. The controller may also include one or more analog-to-digital converters (ADCs) to convert an analog amplitude to a digital format. One or more multiplexers may also be used to avoid unnecessary duplication of circuit elements. Of course, the controller also preferably includes one or more memory devices in which to store the measured amplitudes and associated parameters, and a microprocessor to perform the necessary calculations and control functions.

By measuring an amplitude of the response signal for each of the nodes in the electrode matrix, the controller can generate a matrix of measured values related to the coupling capacitances for each of the nodes of the electrode matrix. These measured values can be compared to a similar matrix of previously obtained reference values in order to determine which nodes, if any, have experienced a change in coupling capacitance due to the presence of a touch.

Figure 2:
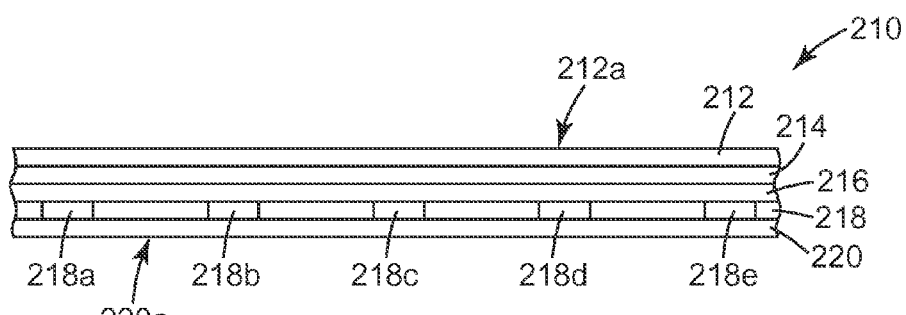
FIG. 2 is a schematic side view of a portion of a touch panel used in a touch device.

Turning now to FIG. 2, we see there a schematic side view of a portion of a touch panel 210 for use in a touch device. The panel 210 includes a front layer 212, first electrode layer 214 comprising a first set of electrodes, insulating layer 216, second electrode layer 218 comprising a second set of electrodes 218a-e preferably orthogonal to the first set of electrodes, and a rear layer 220. The exposed surface 212a of layer 212, or the exposed surface 220a of layer 220, may be or comprise the touch surface of the touch panel 210.

Figure 3A:
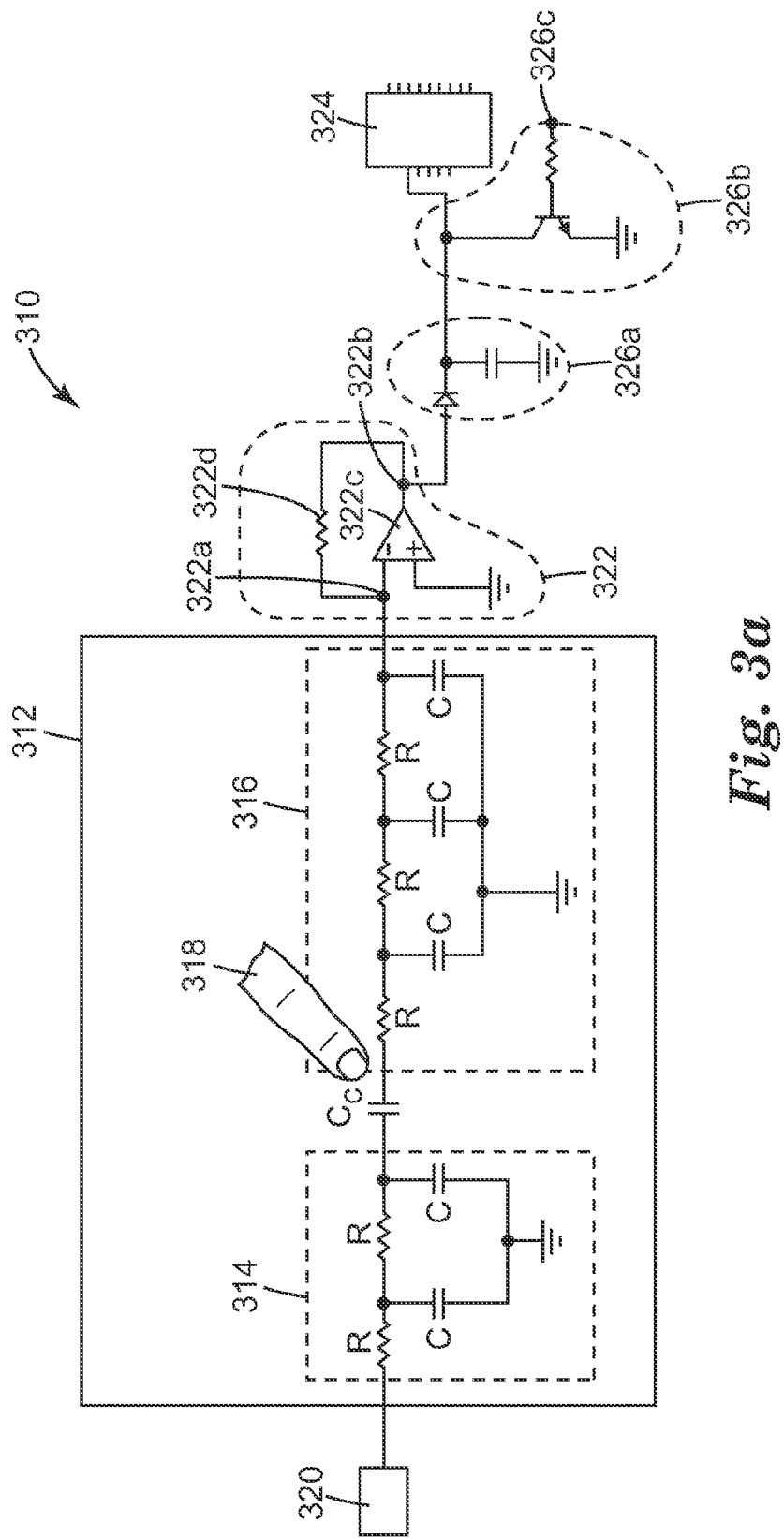
FIG. 3a is a schematic view of a touch device in which relevant drive and detection circuitry is shown in the context of one drive electrode and one receive electrode capacitively coupled thereto.

FIG. 3a depicts a touch device 310 in which relevant controller circuitry, such as drive and detection circuitry, is shown in the context of a touch panel 312 having one drive electrode 314 and one receive electrode 316 capacitively coupled thereto via coupling capacitance $C_c$. The reader will understand that this is a generalization of a touch panel in which drive electrode 314 may be one of a plurality of drive electrodes, and receive electrode 316 likewise may be one of a plurality of receive electrodes, arranged in a matrix on the touch panel.

Indeed, in one specific embodiment of interest capable of use with at least some of the touch measurement techniques described herein, the touch panel may comprise a 40×64 (40 rows, 64 columns) matrix device having a 19 inch diagonal rectangular viewing area with a 16:10 aspect ratio. In this case, the electrodes may have a uniform spacing of about 0.25 inches. Due to the size of this embodiment, the electrodes may have significant stray impedances associated therewith, e.g., a resistance of 40K ohms for the row electrodes and 64 K ohms for the column electrodes. For good human factors touch response, the response time to measure the coupling capacitance at all 2,560 nodes of the matrix (40*64=2560) may, if desired, be made to be relatively fast, e.g., less than 20 or even less than 10 milliseconds. If the row electrodes are used as the drive electrodes and the column electrodes used as the receive electrodes, and if all of the column electrodes are sampled simultaneously, then the 40 rows of electrodes have, for example, 20 msec (or 10 msec) to be scanned sequentially, for a time budget of 0.5 msec (or 0.25 msec) per row electrode (drive electrode).

The drive electrode 314 and receive electrode 316 of FIG. 3a, which are depicted by their electrical characteristics (in the form of lumped circuit element models) rather than by their physical characteristics, are representative of electrodes that may be found in a touch device having a matrix smaller than 40×64, but this is not to be considered limiting. In this representative embodiment of FIG. 3a, the series resistances R shown in the lumped circuit models may each have values of 10K ohms, and the stray capacitances C shown in the lumped circuit models may each have values of 20 picofarads (pf), but of course these values are not to be taken as limiting in any way. In this representative embodiment the coupling capacitance $C_c$ is nominally 2 pf, and the presence of a touch by a user's finger 318 at the node between electrodes 314, 316 causes the coupling capacitance $C_c$ to drop by about 25%, to a value of about 1.5 pf. Again, these values are not to be taken as limiting.

In accordance with the controller described earlier, the touch device 310 uses specific circuitry to interrogate the panel 312 so as to determine the coupling capacitance $C_c$ at each of the nodes of the panel 312. In this regard, the reader will understand that the controller may determine the coupling capacitance by determining the value of a parameter that is indicative of, or responsive to, the coupling capacitance, e.g., an amplitude of a response signal as mentioned above and described further below. To accomplish this task, the device 310 preferably includes: a low impedance drive unit 320 coupled to the drive electrode 314; a sense unit 322 coupled to the receive electrode 316, which, in combination with the coupling capacitance, performs a differentiation on the drive signal supplied by the drive unit; and an analog-to-digital converter (ADC) unit 324 that converts an amplitude of the response signal generated by the sense unit 322 into a digital format. Depending on the nature of the drive signal supplied by the drive unit 320 (and hence also on the nature of the response signal generated by the sense unit 322), the device 310 may also include a peak detection circuit 326a which in this embodiment also serves as a sample/hold buffer, and an associated reset circuit 326b operable to reset the peak detector. In most practical applications the device 310 will also include a multiplexer between the signal generator 320 and the touch panel 312, so as to have the capability of addressing any one of a plurality of drive electrodes at a given time, as well as a multiplexer between the sense unit 322 (or between the optional circuit 326b) and the ADC unit 324, to allow a single ADC unit to rapidly sample the amplitudes associated with multiple receive electrodes, thus avoiding the expense of requiring one ADC unit for each receive electrode.

The drive unit 320 preferably is or includes a voltage source with an internal impedance that is preferably low enough to maintain good signal integrity, reduce injected noise, and/or maintain fast signal rise and fall times. The drive unit 320 provides a time-varying drive signal at an output thereof to the drive electrode 314. The drive signal may consist essentially of a single, isolated pulse, or it may comprise a plurality of such pulses or a train of pulses that form a continuous AC waveform, or waveform packet, such as a sinusoidal wave, a square wave, a triangle wave, and so forth. In this regard, the term "pulse" is used in a broad sense to refer to a distinctive signal variation and is not limited to a rectangular shape of short duration and high amplitude. If rapid detection of touch(es) on the touch panel is desired, the drive signal preferably includes only the smallest number of pulses necessary to obtain a reliable measurement of the coupling capacitance at a given node. This becomes particularly important for touch panels that have large electrode matrices, i.e., a large number of nodes to sense. The peak or maximum amplitude of the drive pulse(s) is preferably relatively high, e.g., from 3 to 20 volts, to provide good signal-to-noise ratios. Though shown in FIG. 3a as driving electrode 314 from only one end, in some embodiments drive unit 320 may be configured to drive electrode 314 from both of its ends. This may be useful, for example, when electrode 314 has high resistance (thus increased drive signal attenuation and susceptibility to noise contamination), as may exist on large ITO-based matrix-type touch sensors.

The reader should keep in mind that there may be a distinction between the drive signal provided at the output of drive unit 320, and the drive signal being delivered to a particular drive electrode 314. The distinction becomes important when, for example, a multiplexer or other switching device is placed between the drive unit 320 and the touch panel 312 in order to selectively couple the drive unit to a plurality of drive electrodes, e.g., one at a time. In such a case, the drive unit 320 may have at its output a continuous AC waveform, such as square wave, triangle wave, or the like, yet by virtue of the switching action of the multiplexer, only one pulse of such a waveform, or only a few pulses, may be delivered to any given drive electrode at a time. For example, one pulse of a continuous AC waveform may be delivered to a first drive electrode, the next pulse of the AC waveform may be delivered to the next drive electrode, and so on until all drive electrodes have been driven, whereupon the next pulse of the AC waveform is delivered again to the first drive electrode and so forth in a repeating cycle.

As will be explained further below in connection with FIGS. 4-6, the shape of the pulses used in the drive signal may have an impact on the choice of detection/measurement electronics to be used in the device. Examples of useable pulse shapes include rectangle pulses, ramped pulses (whether symmetric or asymmetric), and sine wave (e.g., bell-shaped) pulses.

The drive unit 320 may if desired be programmable to provide different pulses at different times. For example, if the drive unit is coupled to a plurality of drive electrodes through a multiplexer, the drive unit may be programmed to provide different signal levels for different drive electrodes to compensate for electrode-to-electrode variations in line resistance and stray capacitance. For example, a drive electrode disposed at a position that requires a long conduction length through the receive electrode(s) is beneficially driven with a higher amplitude drive signal than a drive electrode disposed at a position that requires a shorter conduction length, so as to compensate for losses associated with the receive electrodes. (For example, referring to the electrode matrix of FIG. 1, if row electrodes 118a-e are the drive electrodes, then a drive signal on electrode 118a is coupled through longer lengths of the receive electrodes 116a-e than a drive signal on electrode 118e due to the placement of the control lines 126 proximate electrode 118e.) Providing different drive signal levels for different drive electrodes in this way is particularly advantageous for large electrode matrices, because rather than programming a large number of detection circuits (corresponding to the number of receive electrodes) for losses in the touch screen, only one drive signal is adjusted by a selected amount, with drive signals delivered to different drive electrodes being adjusted by differing amounts as appropriate.

The drive signal provided to the drive electrode 314 is capacitively coupled to receive electrode 316 via the coupling capacitance $C_c$, the receive electrode in turn being connected to sense unit 322. The sense unit 322 thus receives at an input thereof 322a the drive signal (as transmitted by the electrodes 314, 316 and coupling capacitance $C_c$), and generates therefrom a response signal at an output 322b. Preferably, the sense unit is designed so that the response signal includes a differentiated representation of the drive signal, an amplitude of which is responsive to the coupling capacitance $C_c$. That is, the response signal generated by the sense unit preferably includes in some form at least an approximation of the derivative with respect to time of the drive signal. For example, the response signal may include the time derivative of the drive signal, or a version of such signal that is inverted, amplified (including amplification less than 1), offset in voltage or amplitude, and/or offset in time, for example. To repeat from the earlier discussion, if the drive signal delivered to the drive electrode is represented by a function f(t), then the response signal may be or comprise, at least approximately, a function g(t), where g(t)=d f(t)/dt.

An exemplary circuit to perform such function is shown in FIG. 3a. The input to such circuit, shown at 322a, is the inverting input (−) of an operational amplifier 322c. The other input of the op amp, a non-inverting input (+), is set to a common reference level that can be optimized for maximum signal range. In FIG. 3, this reference level is shown as ground potential for simplicity, but non-zero offset voltages can also be used. A feedback resistor 322d is connected between the output of the op amp at 322b and the inverting input. When connected in this way, the inverting input of the op amp 322c, i.e., the input 322a, is maintained as a virtual ground summing point, and no signal is observed at that point. This also means that the receive electrode 316 is maintained at a constant voltage substantially equal to the voltage at which the non-inverting input of the op amp is held. The feedback resistor 322d can be selected to maximize signal level while keeping signal distortion low, and can be otherwise set or adjusted as described herein.

The op amp 322c connected in this fashion, in combination with the coupling capacitance $C_c$, has the effect of producing a differentiated representation of the drive signal that is delivered to drive electrode 314. In particular, the current I flowing through the feedback resistor 322d at any given time is given by:

$$I \approx C_c * dV/dt,$$

where $C_c$ is the coupling capacitance, V represents the time-varying drive signal delivered to the drive electrode, and dV/dt is the derivative with respect to time of V. Although this equation is nominally correct, the reader will understand that it does not take into account various second order effects caused by, for example, parasitic resistance and capacitance of the electrodes being used, op amp characteristics and limitations, and the like, which can affect both the magnitude and the dynamic response of the current I. Nevertheless, the current I, flowing through the feedback resistor, produces a voltage signal at the output 322b which corresponds to the response signal discussed above. Due to the direction of current flow through the feedback resistor, this response signal is inverted insofar as a positive dV/dt (V increases with time) produces a negative voltage at output 322b, and a negative dV/dt (V decreases with time) produces a positive voltage at output 322b, with specific examples given below in connection with FIGS. 4-6. This can be expressed as:

$$V_{RS} \approx -R_f * C_c * dV/dt,$$

where $V_{RS}$ represents the response signal voltage at the output 322b at any given time, and $R_f$ is the resistance of feedback resistor 322d. Note that the amplitude (voltage) of the response signal is nominally proportional to the coupling capacitance $C_c$. Thus, since a touch at the node of the electrodes 314, 318 reduces the coupling capacitance $C_c$, a measure of the peak amplitude or other characteristic amplitude of the response signal provided by sense unit 322 can be analyzed to determine the presence of a touch at that node.

In embodiments in which receive electrode 316 is one of a plurality of receive electrodes, it may be desirable to include a dedicated sense unit 322 for each receive electrode. Further, it may be advantageous to provide different amounts of amplification (e.g., different feedback resistor values for the different op amps) for the different sense units to compensate for signal losses in the touch screen that are different for different drive electrodes. For example, a receive electrode disposed at a position that requires a long conduction length through the drive electrode(s) is beneficially provided with a greater amplification than a receive electrode disposed at a position that requires a shorter conduction length, so as to compensate for losses associated with the drive electrodes. (For example, referring to the electrode matrix of FIG. 1, if row electrodes 116a-e are the receive electrodes, then a signal received from electrode 116a is coupled through longer lengths of the drive electrodes 118a-e than a signal received from electrode 116e due to the placement of the control lines 128 proximate electrode 116e.) Providing different amounts of amplification for different receive electrodes in this way is particularly advantageous for large electrode matrices, because it can reduce the need to program a large number of detection circuits (corresponding to the number of receive electrodes) for losses in the touch screen.

As mentioned above, device 310 may also include peak detection circuit 326a which in this embodiment also serves as a sample/hold buffer, and an associated reset circuit 326b operable to reset the peak detector. These circuit elements can be used in cases where the peak amplitude of the response signal generated by the sense unit 322 is to be used as a measure of the coupling capacitance $C_c$. Such cases can include embodiments in which the response signal provided by the sense unit 322 is highly transient, e.g., in cases where one or more rectangle pulses are used for the drive signal (see e.g. FIG. 4a below). In such cases, the peak detector 326a operates to maintain the peak amplitude of the response signal for a relatively long time to allow reliable sampling and conversion to a digital value by the ADC 324. In embodiments having a plurality of receive electrodes, a single ADC may be cyclically coupled to the detection circuitry of each receive electrode, requiring each detection circuit to maintain the measurement voltage for an extended period of time. After the measurement is made by the ADC 324, the peak detector can be reset by operation of reset circuit 326b so that a new peak value can be measured in a subsequent cycle.

The basic operation of the diode/capacitor combination depicted for peak detector 326a, including its ability to maintain the peak voltage for an extended period without discharging the capacitor through the sense unit 322, will be apparent to the person of ordinary skill in the art, with no further explanation being necessary. Likewise, the basic operation of the reset circuit 326b, responding to a suitable reset control signal provided at contact 326c, will be apparent to the person of ordinary skill in the art. Note that other known electronic devices capable of carrying out one or more functions of the described sense unit, peak detector, sample/hold buffer, and/or reset circuit, whether in hardware, software, or combinations thereof, are fully contemplated herein.

As mentioned previously, the ADC 324 is preferably provided to convert the amplitude value associated with the response signal to a digital format for use with digital components such as a microprocessor for further processing. The ADC may be of any suitable design, e.g., it may comprise a high speed successive approximation register (SAR) and/or a sigma-delta type converter.

With regard to further processing of the measured amplitude value of a given node, the measured amplitude value can be stored in a memory register. If desired, multiple such values associated with the given node may be stored and averaged, e.g. for noise reduction purposes. Furthermore, the measured amplitude value is preferably compared to a reference value in order to determine if a reduction of the coupling capacitance has occurred, i.e., if some amount of touch is present at the given node. Such comparison may involve subtraction of the measured value from the reference value, for example. In embodiments involving a large touch matrix containing many nodes, the measured values for all of the nodes can be stored in memory, and individually compared to respective reference values in order to determine if some amount of touch is present at each node. By analyzing the comparison data, the positions of multiple temporally overlapping touches, if present on the touch surface, can be determined. The number of temporally overlapping touches capable of being detected may be limited only by the dimensions of the electrode grid in the touch panel and the speed of the drive/detection circuitry. In exemplary embodiments, interpolation is performed for differences detected for neighboring nodes so as to accurately determine a touch location lying between nodes.

Figure 3B:
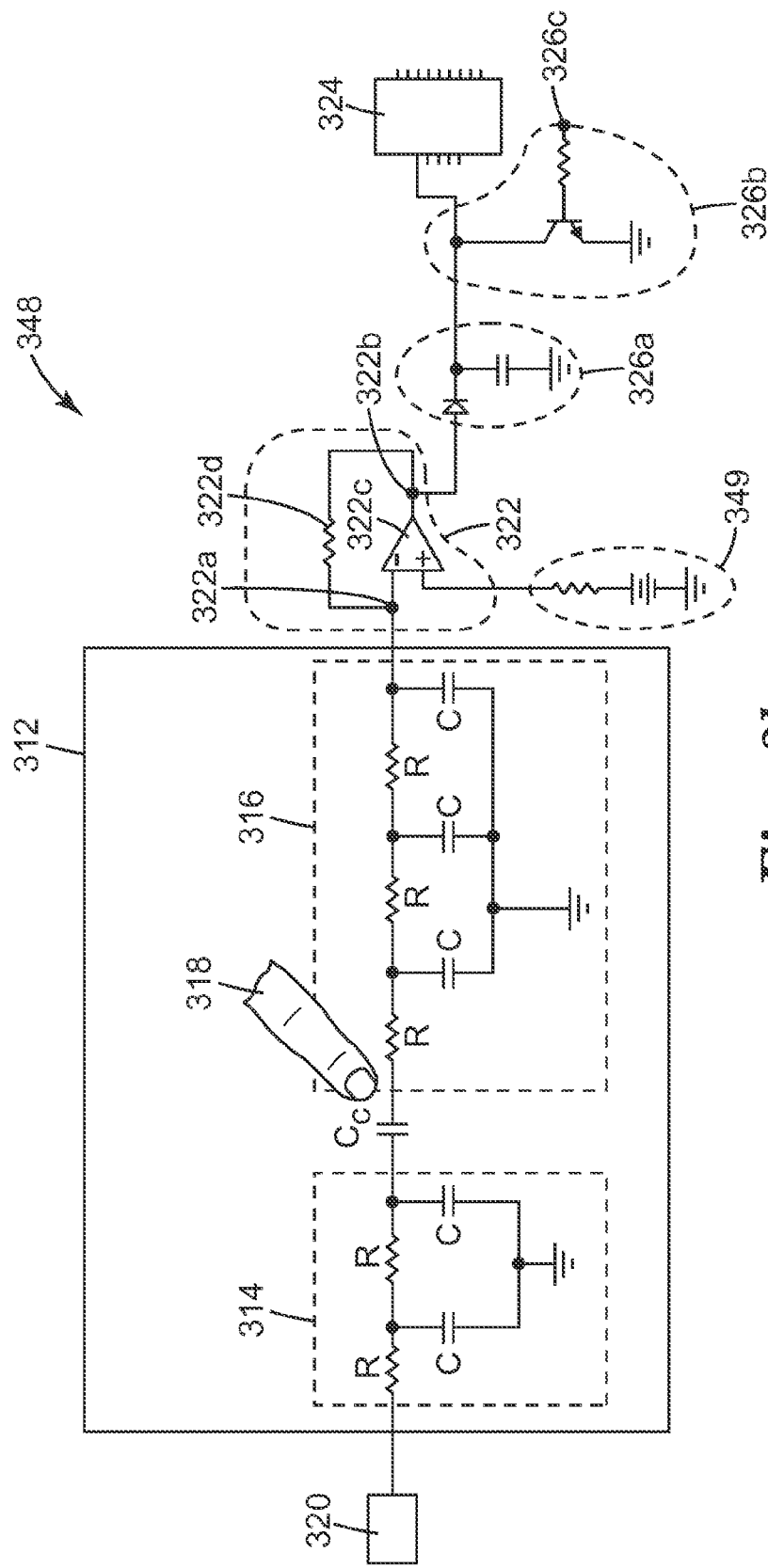
FIG. 3b is a schematic view of a touch sensitive device similar to that of FIG. 3a, but including additional circuitry to account for differences of signal strength on receiver electrodes.

FIG. 3b depicts touch device 348 which is similar to touch device 310 shown in FIG. 3a, except that it includes voltage source 349 as an input to the differentiating amplifier that is part of sense unit 322. This voltage input may be configured as needed to bring circuit output into a sensing range for the ADC. For example, some ADCs have sensing ranges from 0.5V to +3V. The peak of the sense unit 322 output signal should be within this range to digitize the voltage accurately. Voltage source 349 (or gain, in the context of sense unit 322) can be fixed at one voltage for all receiver electrodes, or it can be adjusted for particular receive electrodes. In some embodiments, differing voltages are provided to sense units in groups of 4-10 receive electrodes using a resistor ladder network. In some embodiments, gain is set to compensate for signal drop off due to resistance on the driven electrodes.

Figure 3C:
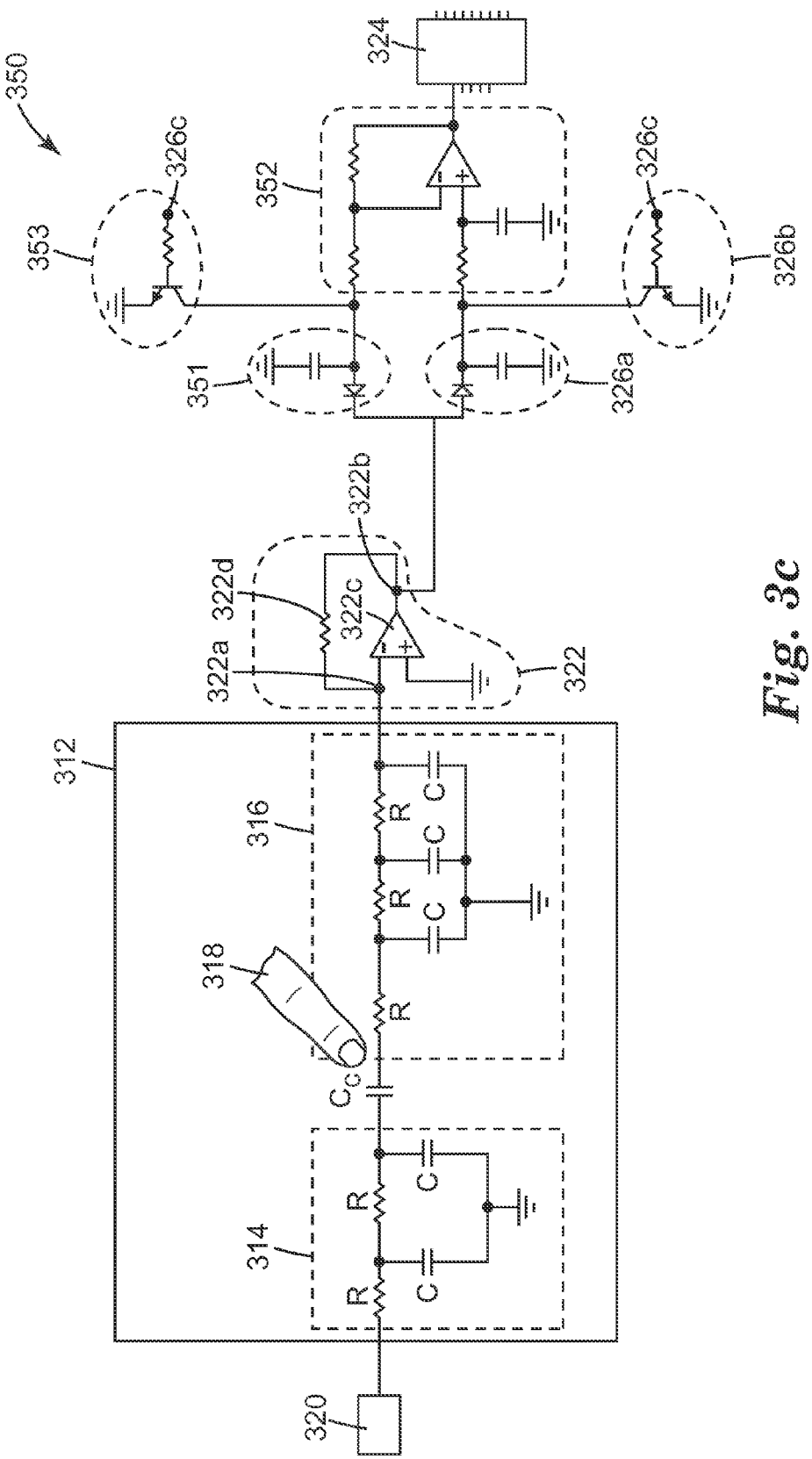
FIG. 3c is a schematic view of a touch sensitive device similar to that of FIG. 3a, but including additional circuitry to account for noise from, for example, a display.

FIG. 3c depicts touch device 350 which is similar to touch device 310 shown in FIG. 3a, but containing additional circuitry that in some embodiments may better accommodate noise from displays such as LCD displays. LCD addressing frequencies are generally near or overlapping the frequencies used by controller 114 to interface with touch panel 112. This results in noise on the receiver electrodes which may show up as a common mode signal. A differential amplifier may be used to eliminate this common mode signal. The circuit shown in FIG. 3c adds a differential amplifier 352 and additional peak detection circuit 351 (configured to detect peaks of negative voltage), and an additional reset circuit 353.

Figure 4A:
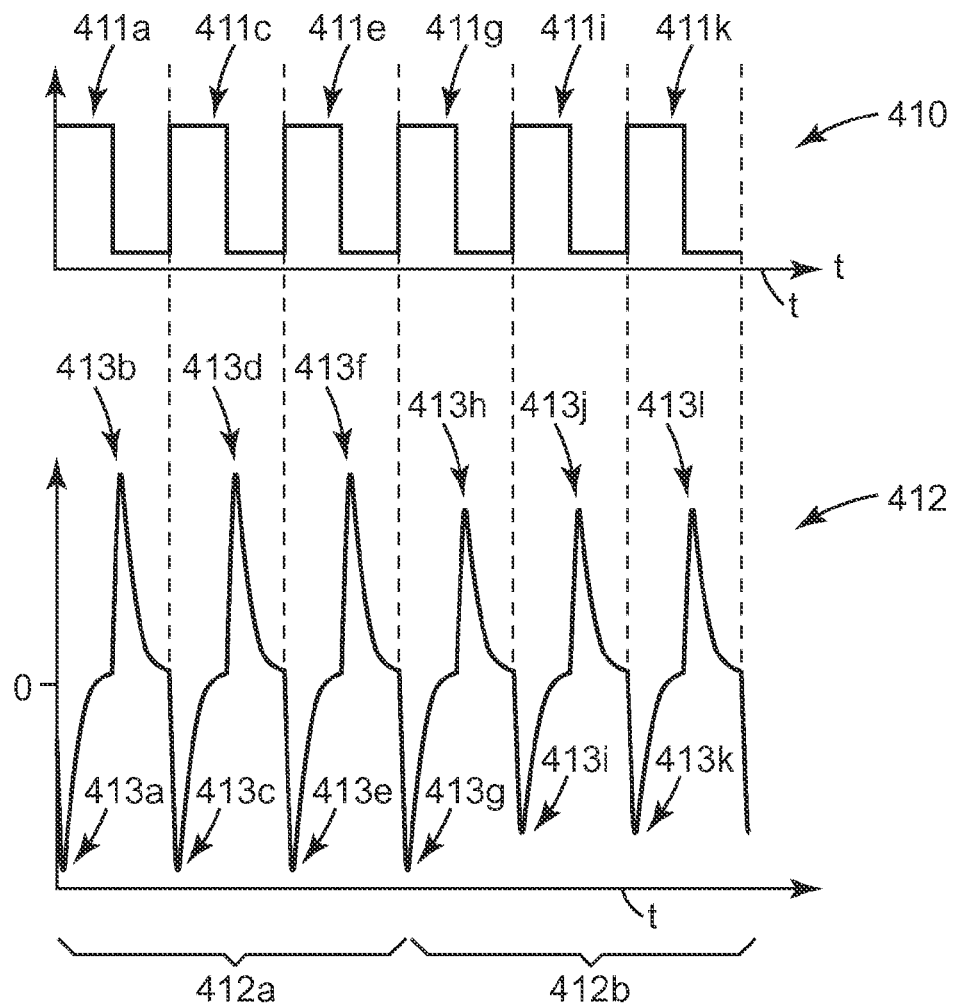
FIG. 4a is a graph of a drive signal and a corresponding (modeled) response signal for the touch device of FIG. 3a, wherein the drive signal includes rectangle pulses and the response signal includes impulse pulses.

Turning now to FIG. 4a, we see there a voltage vs. time graph of a particular drive signal 410 and a corresponding voltage vs. time graph of a (modeled) response signal 412 generated by a sense unit of the type depicted in FIG. 3a. For purposes of the model, the electronic characteristics of the drive electrode, receive electrode, and coupling capacitance (including the effect of a touch thereon, i.e., decreasing the capacitance from 2.0 pf to 1.5 pf) were assumed to be as described above in connection with the representative embodiment of FIG. 3a. Furthermore, the feedback resistor 322d for the op amp 322c was assumed to be on the order of 2 M ohms.

The drive signal 410 is seen to be a square wave, containing a series of rectangle pulses 411a, 411c, 411e, ... 411k. This entire signal was assumed to be delivered to a particular drive electrode, although in many embodiments a smaller number of pulses, e.g. only one or two, may be delivered to a given drive electrode at a given time, after which one or more pulses may be delivered to a different drive electrode, and so on. The response signal 412 generated by the sense unit is seen to comprise a plurality of impulse pulses 413a-l, two for each rectangle pulse 411a, as one would expect for a differentiated square wave. Thus, for example, the drive pulse 411a yields a negative-going impulse pulse 413a associated with the positive-going transition (left side) of the rectangle pulse, and a positive-going impulse pulse 413b associated with the negative-going transition (right side) of the rectangle pulse. The impulse pulses are rounded as a result of the op amp signal bandwidth and the RC filter effects of the touch screen. Despite these deviations from an ideal derivative with respect to time of signal 410, the response signal 412 can be considered to comprise a differentiated representation of the drive signal.

As shown, the drive pulses 411a, 411c, 411e, ... 411k, all have the same amplitude, although pulses of differing amplitude can also be delivered as explained above. However, despite the common amplitude of the drive pulses, the impulse pulses 413a-g occurring in the time period 412a are seen to have a first peak amplitude, and impulse pulses 413h-l occurring in the time period 412b are seen to have a second peak amplitude less than the first peak amplitude. This is because the model introduced a change in coupling capacitance $C_c$ at a point in time after impulse pulse 413g and before impulse pulse 413h, the change corresponding to a transition from a non-touch condition ($C_c$=2 pf) to a touch condition ($C_c$=1.5 pf). The reduced peak amplitude of the impulse pulses during time period 412b can be readily measured and associated with a touch event at the applicable node.

The transient nature of the impulse pulses 413a-l make them particularly suited for use with a peak detector and sample/hold buffer as described in connection with FIG. 3, so that an accurate measurement of the peak amplitude can be obtained and sampled by the ADC.

Figure 4B:
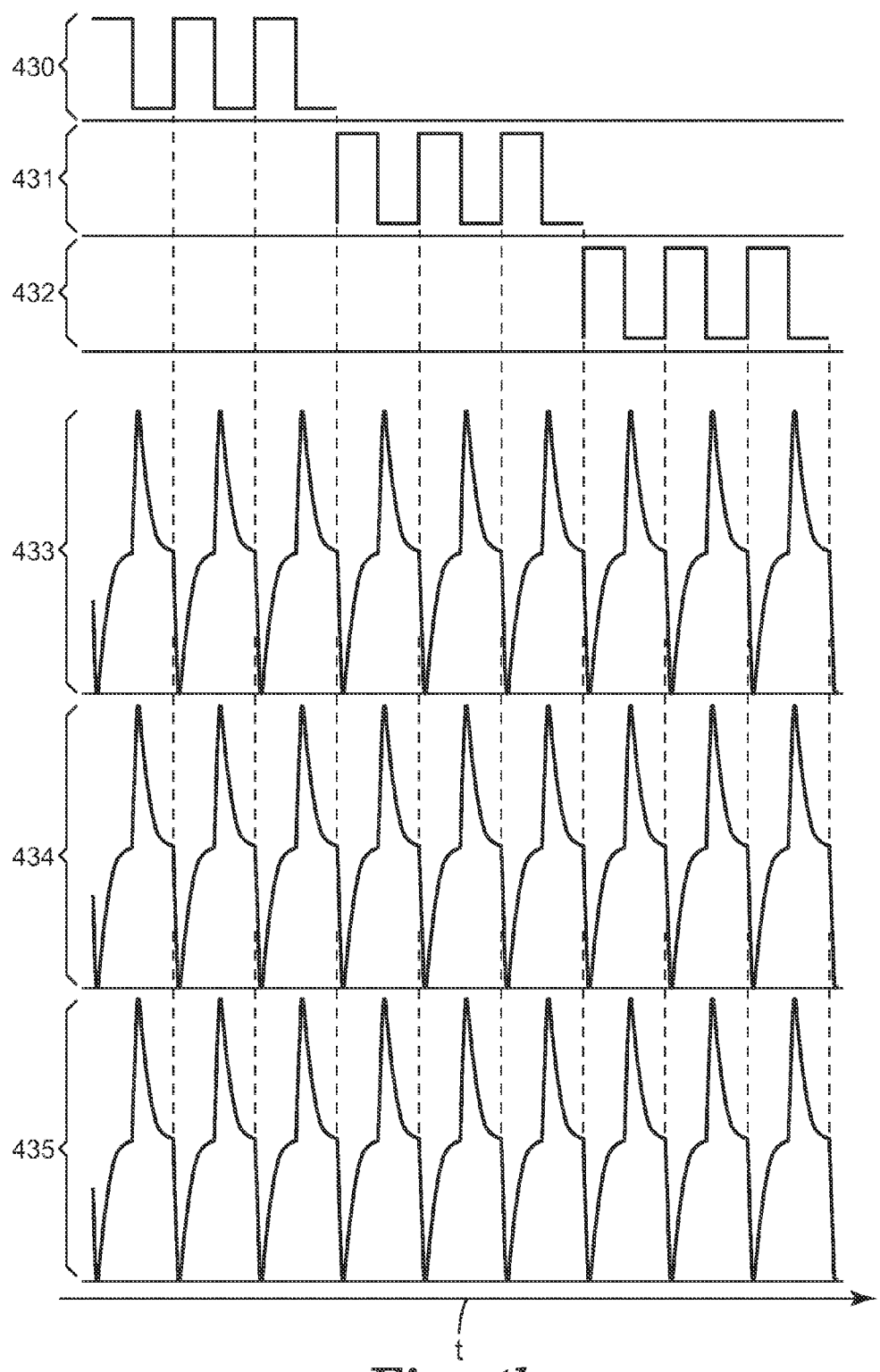
FIG. 4b is a graph showing modeled waveforms for three driven electrodes, and associated response waveforms on three receive electrodes.

FIG. 4b depicts graphs showing representative waveforms from an embodiment that includes sequential driving of driven electrodes. Waveforms 430, 431, and 432 are representative of pulsed signals during a period of time, t, on three separate (possibly adjacent one another) driven electrodes (a first, second, and third row on a matrix-type sensor, for example). Waveforms 433, 434, and 435 are representative of differentiated output resulting from the pulsed signals on three separate receive electrodes (columns on a matrix-type sensor, for example) during the same time period. Note that each receive electrode (column) has a similar response profile. The driven electrodes corresponding to waveforms 432, 431, and 431 are driven sequentially. After each an electrode is driven (represented by any individual ones of waveforms 430, 431, or 432), a voltage representative of peak amplitude will be available in the peak detect circuit associated with each receive electrode (column) as described above in connection with FIG. 3. Thus, after each driven electrode is driven (row), the resultant voltage on the peak detect circuit for all receive electrodes (columns) is sampled, then the associated peak detect circuit reset, then the next sequential driven electrode is driven (and so on). In this way, each node in the matrix-type capacitive touch sensor can be individually addressed and sampled.

Figure 5A:
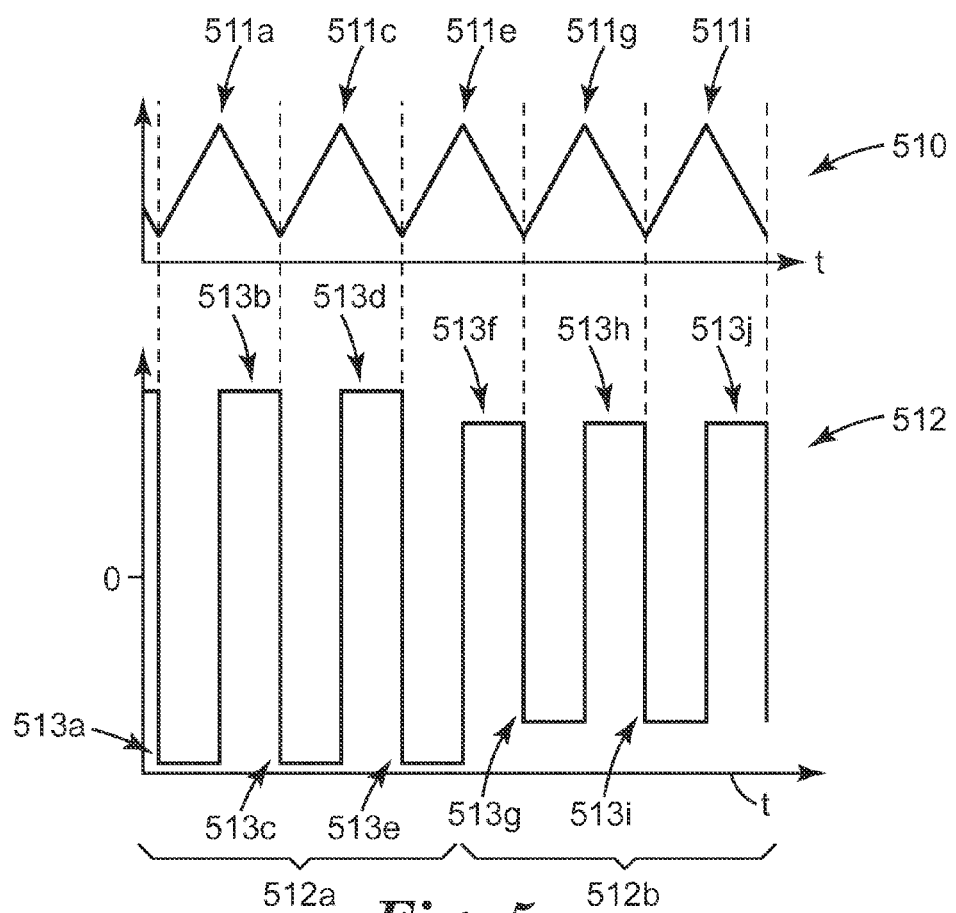
FIG. 5a is a graph similar to that of FIG. 4a but for a different drive signal, the drive signal including ramped pulses and the response signal including rectangle-like pulses.

FIG. 5a depicts a pair of graphs similar to those of FIG. 4a, and for the same electronic configuration of drive electrode, receive electrode, coupling capacitance, and sense unit, but for a different drive signal shape. The drive signal 510 of FIG. 5a includes ramped pulses 511a, 511c, 511e, ... 511i, so that the resultant response signal 512 includes rectangle pulses 513a-j. The rectangle pulses predicted by the model exhibited near-vertical hi/lo transitions with slightly rounded corners, which have been redrawn as vertical lines and sharp corners for simplicity. The rise and fall times of the rectangle pulses are limited by the RC transmission line in the drive and receive electrodes being used. The drive pulses 511a, etc. are characterized by a symmetrical ramp shape, with the first half of each pulse having a positive-going slope and the second half having a negative-going slope of the same magnitude. This symmetry is also then carried over to the response signal 512, where negative-going pulses 513a, 513c, and so forth are substantially balanced by positive-going pulses 513b, 513d, and so on. Similar to the description of FIG. 4a, the model introduces a change in coupling capacitance $C_c$ at a point in time after rectangle pulse 513e and before rectangle pulse 513f, i.e., in the transition from time period 512a to time period 512b, the change corresponding to a transition from a non-touch condition ($C_c$=2 pf) to a touch condition ($C_c$=1.5 pf). The reduced amplitude of the response signal pulses occurring during time period 412b can be readily measured and associated with a touch event at the applicable node. A feature of FIG. 5a worth noting is the relatively steady-state characteristic (over the time scale of given pulse) of the response signal 512 at each plateau of each pulse 513a-j, where the "plateau" of a negative-going pulse 513a, 513c, and so on is understood to be the "bottom" of the pulse shape rather than the "top" as with pulses 513b, d, and so forth. This steady-state characteristic is a consequence of the drive pulses having a constant slope over a substantial portion of the drive pulses, i.e., a ramped shape. In some embodiments, the touch device designer may wish to take advantage of this steady-state characteristic so as to eliminate unnecessary circuit items and reduce cost. In particular, since the response signal itself maintains a substantially constant amplitude (the plateau of a pulse) over the time scale of the pulse, and since this constant amplitude is indicative of or responsive to the coupling capacitance $C_c$, the peak detector, sample/hold buffer, and reset circuit described in connection with FIG. 3a may no longer be necessary and may be eliminated from the system, provided the time scale of the steady-state characteristic is long enough for the ADC to sample and measure the amplitude. If desired, for noise-reduction, the response signal generated by the sense unit in such cases can be sent through a low-pass filter whose cutoff frequency is selected to substantially maintain the same overall fidelity or shape as the unfiltered pulses while filtering out higher frequency noise. The output of such a filter, i.e., the filtered response signal, may then be supplied to the ADC. Of course, in some cases it may be desirable to keep the peak detector, sample/hold buffer, and reset circuit, whether or not the low-pass filter is utilized, for ramp-type drive pulses.

If desired, a rectifying circuit can be used in touch device embodiments that produce positive- and negative-going pulses in the response signal, see e.g. signal 412 of FIG. 4a and signal 512 of FIG. 5a. The rectification of these signals may have corresponding benefits for other circuit functions, such as peak detection and analog-to-digital conversion. In the case of signal 512 of FIG. 5a, a rectified version of that signal advantageously maintains a steady-state voltage level substantially continuously (ignoring transient effects due to op amp limitations and RC transmission line effects) as a result of the symmetry of the respective signals.

Figure 5B:
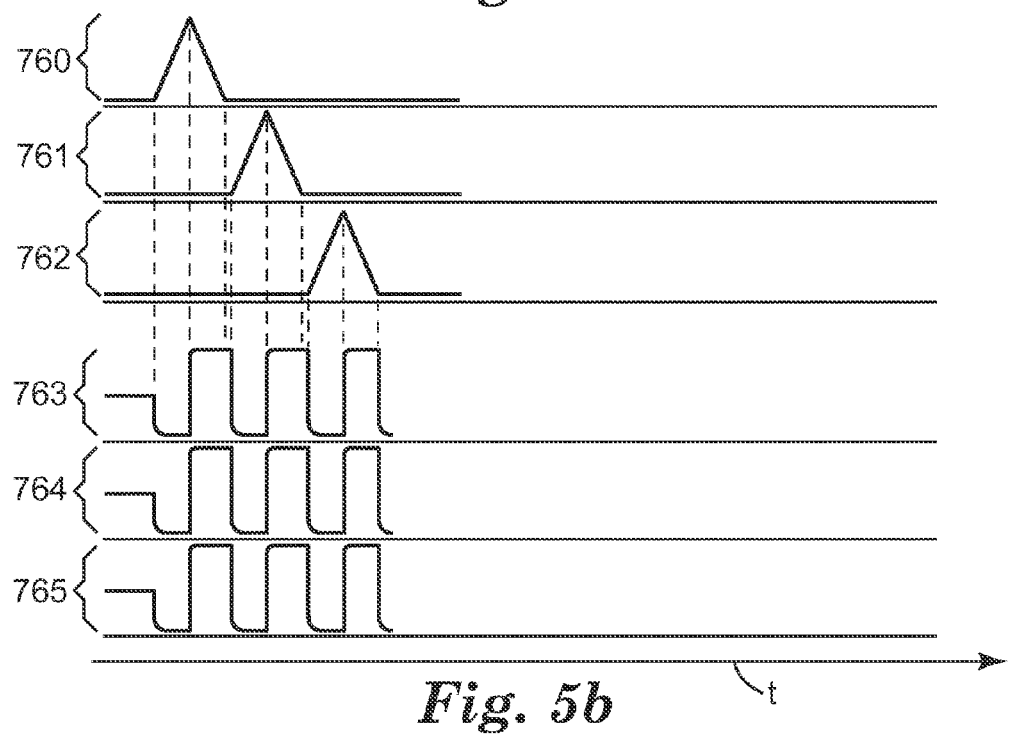
FIG. 5b is a graph showing modeled waveforms for three driven electrodes, and associated response waveforms on three receive electrodes, similar to FIG. 4b.

FIG. 5b depicts pairs of graphs showing representative waveforms from embodiments that include sequential driving of driven electrodes, similar to FIG. 4b, except using a different type of driven waveform. Waveforms 760, 761, and 762 are representative driven triangle pulse signals during a time period, t, on three separate (possibly adjacent one another) driven electrodes (a first, second, and third row on a matrix-type sensor, for example). Waveforms 763, 764, and 765 are respective resultant waveforms as would be seen on receive electrodes (for example, columns) during the same time period.

Figure 6A:
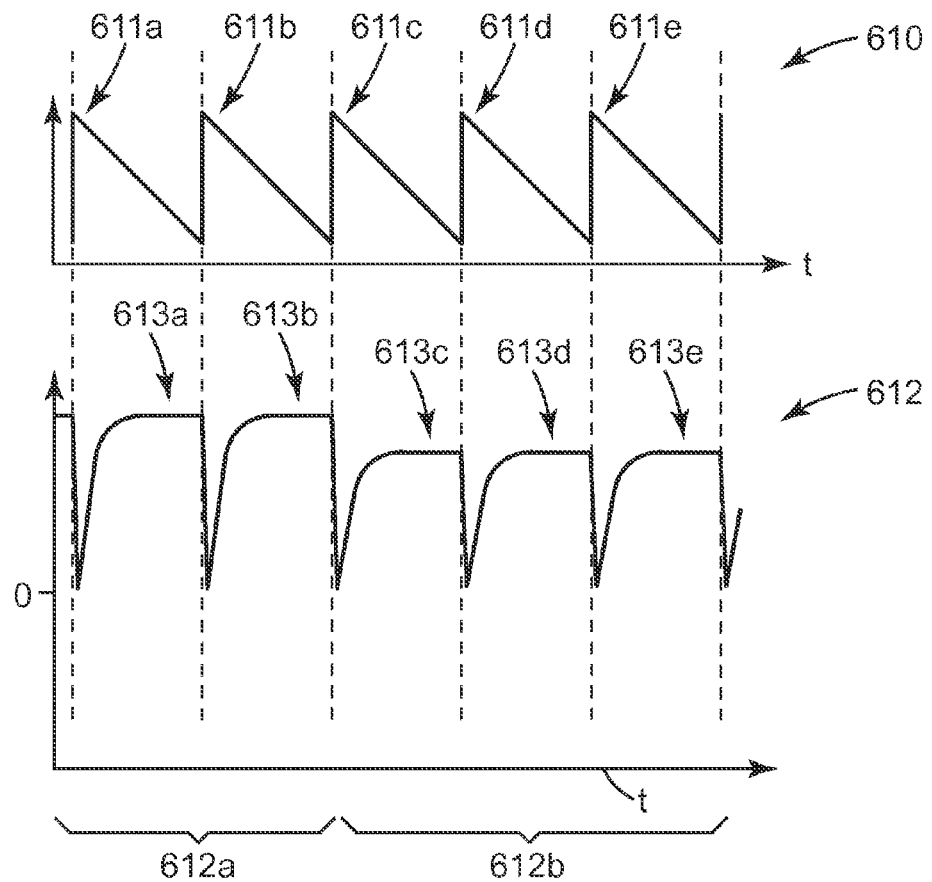
FIG. 6a is a graph of still another drive signal and a schematic depiction of an expected response signal for the touch device of FIG. 3a, the drive signal including ramped pulses and the response signal including rectangle pulses.

Turning now to FIG. 6a, the pair of graphs there are similar to those of FIGS. 5a and 4a, and assume the same electronic configuration of drive electrode, receive electrode, coupling capacitance, and sense unit, but a yet another drive signal shape is used. The drive signal 610 of FIG. 6b includes ramped pulses 611a-e, which yield the resultant response signal 612 having substantially rectangle pulses 613a-e. Unlike the symmetrical ramp shapes of FIG. 5a, ramped pulses 611a-e are asymmetrical so as to maximize the fraction of the pulse time used by the ramp. This ramp maximization, however, results in a rapid low-to-high transition on one side of each drive pulse, which produces a negative-going impulse pulse bounding each rectangle pulse of the response signal 612. In spite of the resulting deviations from perfect rectangularity, the pulses 613a-e are nevertheless substantially rectangular, insofar as they maintain a relatively constant amplitude plateau between two relatively steep high-to-low transitions. As such, and in a fashion analogous to signal 512 of FIG. 5a, the pulses of signal 612 include a steady-state characteristic as a consequence of the drive pulses having a constant slope over a substantial portion of the drive pulses, i.e., a ramped shape. The touch device designer may thus again wish to take advantage of this steady-state characteristic by eliminating the peak detector, sample/hold buffer, and reset circuit, provided the time scale of the steady-state characteristic is long enough for the ADC to sample and measure the amplitude. A low-pass filter may also be added to the circuit design as described above.

Figure 6B:
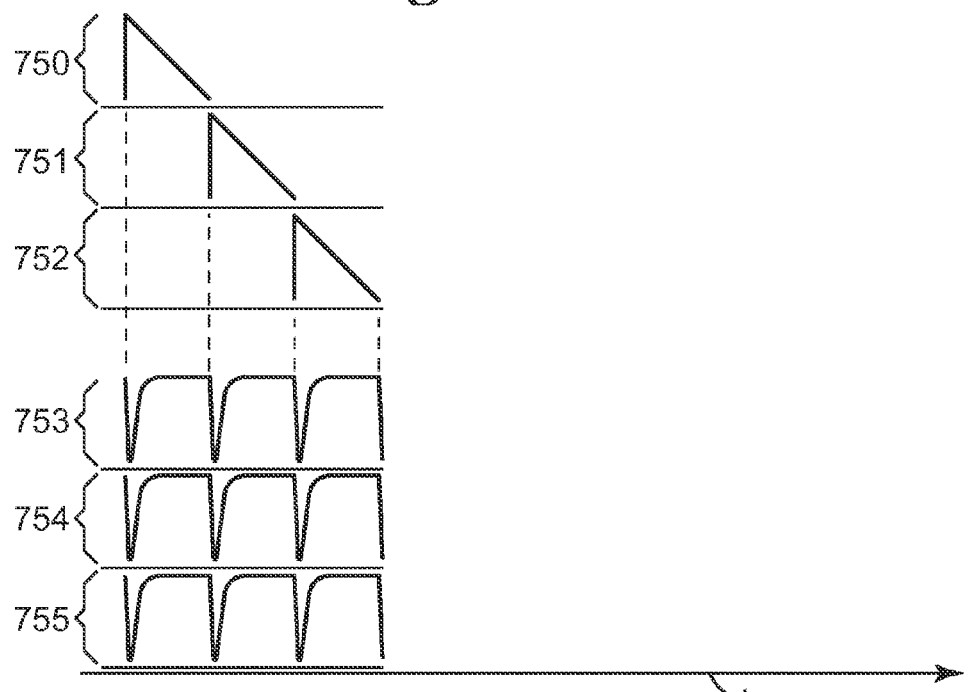
FIG. 6b is a graph showing modeled waveforms for three driven electrodes, and associated response waveforms on three receive electrodes, similar to FIGS. 4b and 5b.

FIG. 6b depicts a pair of graphs showing representative waveforms from embodiments that include sequential driving of driven electrodes, similar to FIG. 4b and FIG. 5b, except using a different type of driven waveform. Waveforms 750, 751, and 752 are representative driven ramped pulse signals during a time period, t, on three separate (possibly adjacent one another) driven electrodes (a first, second, and third row on a matrix-type sensor, for example). Waveforms 753, 754, and 755 (FIG. 7b) and 763, 764, and 765 (FIG. 7c) are respective resultant waveforms as would be seen on receive electrodes (for example, columns) during the same time period.

Figure 7:
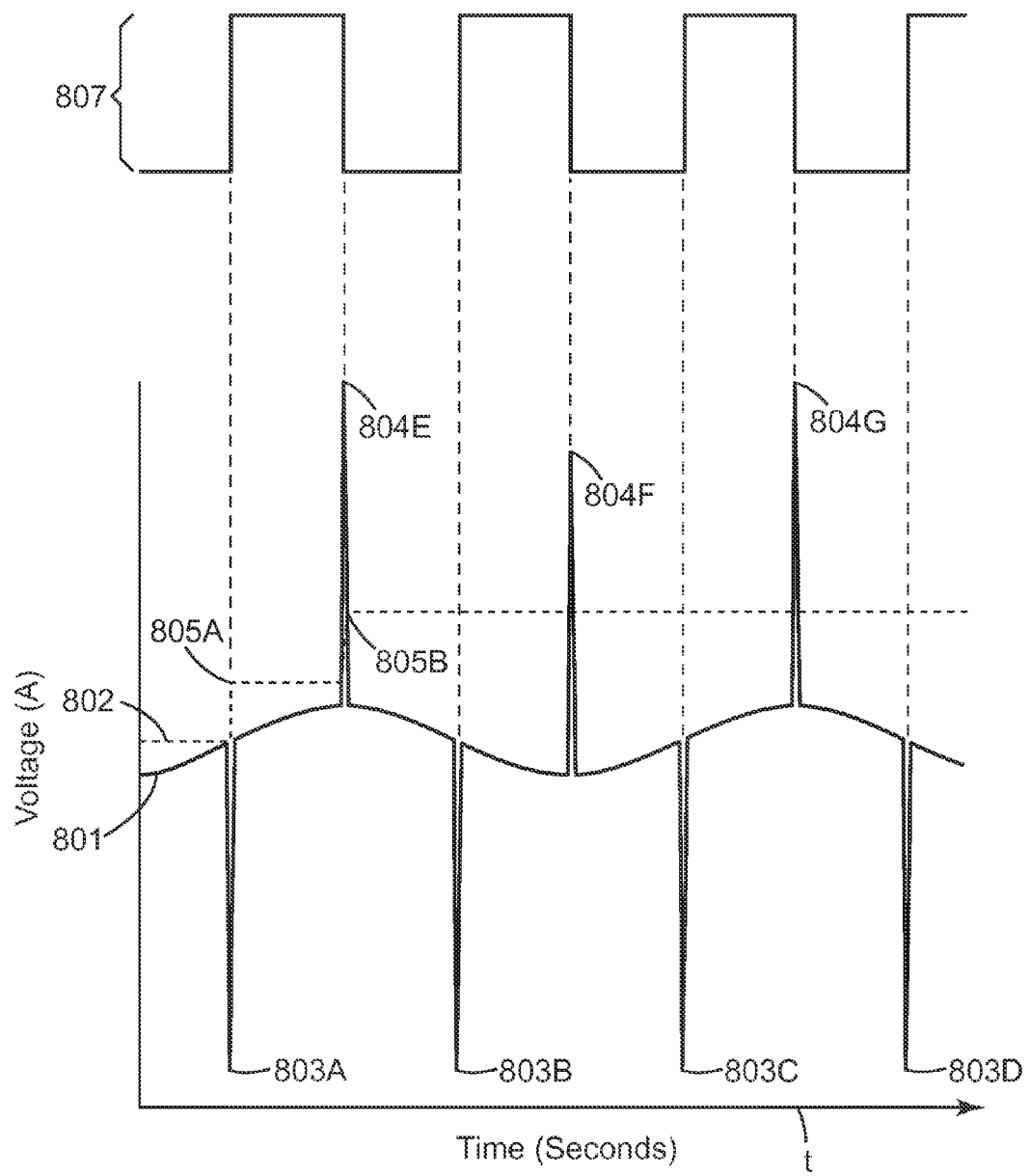
FIG. 7 is a graph of a drive signal and corresponding (modeled) response signal for the touch device of FIG. 3c, wherein the drive signal includes rectangle pulses and the response signal includes impulse pulses; and, FIG. 8 is a schematic view of a touch device that includes a touch panel having a 4×8 matrix of capacitively coupled electrodes, and various circuit components that can be used to detect multiple simultaneous touches on the touch panel.

Turning now to FIG. 7, we see there a voltage vs. time graph of a pulsed drive signal 807 and a corresponding voltage vs. time graph of a (modeled) first response signal 801 and second response signal 802 as would be output generated by sense unit 322 and differential amplifier 352, respectively, of the circuit depicted in FIG. 3c. For purposes of the model, the electronic characteristics of the drive electrode, receive electrode, and coupling capacitance (including the effect of a touch thereon, i.e., decreasing the capacitance from 2.0 pf to 1.5 pf) were assumed to be as described above in connection with the representative embodiment of FIG. 3a.

First response signal 801 is the modeled output from sense unit 322. It includes a sinusoidal form indicative of a common mode signal similar to that which might be received as noise from an LCD panel. Response signal 802 is the respective modeled output from differential amplifier 352 (shown for the purposes of illustration as a short-dashed line; the actual output would be a solid line). The output from differential amplifier 352 is in effect the sum of the pulses (shown not to scale for illustrative purposes). The individual pulses on FIG. 7 (803a . . . d, 804e, f, g) have the same profile as pulses 413a . . . k in FIG. 4a, but they appear differently in FIG. 7 due to scaling. The first negative pulse (803a) is peak detected and summed on the inverting input of the amplifier giving the first step on response signal 802 (step 805a). The positive pulse (804e) is then peak detected and summed on the non-inverting input on the amplifier, giving the sum of both the positive and negative peaks at the output (step 805b). Neither succeeding pulses nor the common mode signal substantially effect the voltage level of response signal 802 after step 805b. A touch may be sensed by measuring a first voltage sample represented by waveform 802 after a series of pulses (that is, after the voltage has reached a plateau defined by step 805b), resetting peak detectors using reset circuits 353 and 326b (FIG. 3c), and then measuring a second voltage sample using the same or a similar process, and so forth. In certain embodiments, changes to these sample voltages, relative to some threshold, are indicative of a touch.

Figure 8:
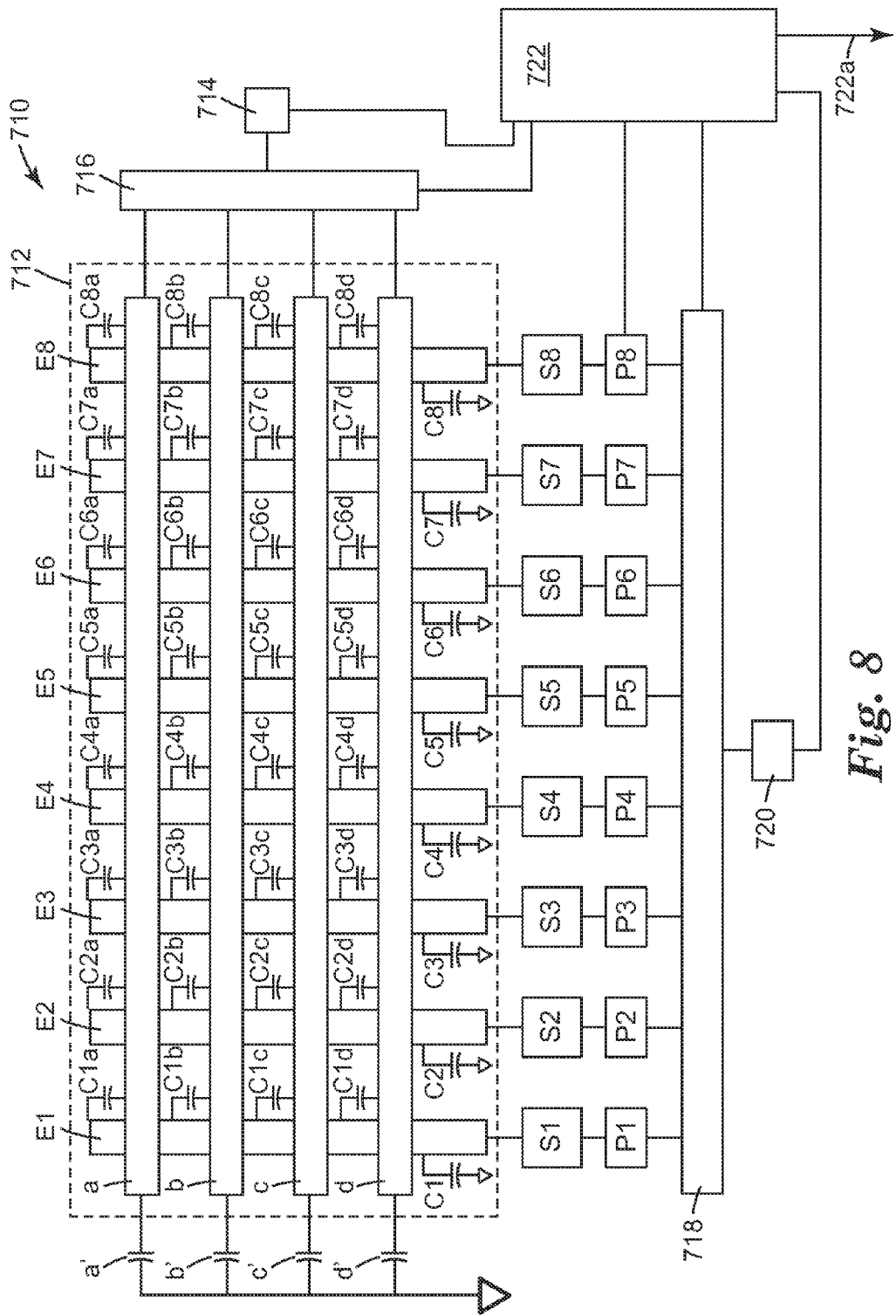

FIG. 8 is a schematic view of a touch device 710 that includes a touch panel 712 having a 4×8 matrix of capacitively coupled electrodes, and various circuit components that can be used to detect multiple simultaneous touches on the touch panel. The electrode matrix includes a top electrode array comprising parallel drive electrodes a, b, c, and d. Also included is a lower array comprising parallel receive electrodes E1, E2, E3, E4, E5, E6, E7, and E8. The top electrode array and the lower electrode array are arranged to be orthogonal to one another. The capacitive coupling between each pair of orthogonal electrodes, referred to above for a given node as the coupling capacitance $C_c$, is labeled for the various nodes of the matrix as C1a, C2a, C3a, C4a, C1b, C2b, and C3b, etc., through C8d as shown, the values of which may all be approximately equal in an untouched state but which decrease when a touch is applied as described previously. Also depicted in the figure is the capacitance between the various receive electrodes and ground (C1-C8) and between the various drive electrodes and ground (a' through d').

The 32 nodes of this matrix, i.e., the mutual capacitances or coupling capacitances associated therewith, are monitored by circuitry as described with respect to FIG. 3a: drive unit 714; multiplexer 716; sense units S1-S8; optional peak detectors P1-P8, which may also function as sample/hold buffers; multiplexer 718; as well as ADC 720; and controller 722, all connected as shown with suitable conductive traces or wires (except that connections between controller 722 and each of the peak detectors P1-P7 are omitted from the drawing for ease of illustration).

In operation, controller 722 causes drive unit 714 to generate a drive signal comprising one or more drive pulses, which are delivered to drive electrode a by operation of multiplexer 716. The drive signal couples to each of receive electrodes E1-E8 via their respective mutual capacitances with drive electrode a. The coupled signal causes the sense units S1-S8 to simultaneously, or substantially simultaneously, generate response signals for each of the receive electrodes. Thus, at this point in time in the operation of device 710, the drive signal being delivered to drive electrode a (which may include, for example, a maximum of 5, 4, 3, or 2 drive pulses, or may have only one drive pulse) is causing sense unit S1 to generate a response signal whose amplitude is indicative of coupling capacitance C1a for the node E1/a, and sense unit S2 to generate a response signal whose amplitude is indicative of coupling capacitance C2a for the node E2/a, etc., and so on for the other sense units S3-S8 corresponding to nodes E3/a through E8/a, all at the same time. If the response signals are of a highly transient nature, e.g. as with signal 412 of FIG. 4a, then peak detectors P1-P8 may be provided to detect the peak amplitudes of the respective response signals provided by sense units S1-S8, and optionally to sample and hold those amplitudes at the outputs thereof which are provided to the multiplexer 718. Alternatively, if the response signals have a significant steady-state characteristic, e.g. if they are in the form of one or more rectangle pulses as with signals 512 and 612 described above, then the peak detectors may be replaced with low-pass filters, or the peak detectors may simply be omitted so that the outputs of the sense units feed directly into the multiplexer 718. In either case, while the characteristic amplitude signals (e.g. peak amplitude or average amplitude of the response signals) are being delivered to the multiplexer 718, the controller 722 rapidly cycles the multiplexer 718 so that the ADC 720 first couples to peak detector P1 (if present, or to a low-pass filter, or to S1, for example) to measure the characteristic amplitude associated with node E1/a, then couples to peak detector P2 to measure the characteristic amplitude associated with node E2/a, and so forth, lastly coupling to peak detector P8 to measure the characteristic amplitude associated with node E8/a. As these characteristic amplitudes are measured, the values are stored in the controller 722. If the peak detectors include sample/hold buffers, the controller resets them after the measurements are made.

In the next phase of operation, the controller 722 cycles the multiplexer 714 to couple the drive unit 714 to drive electrode b, and causes the drive unit to generate another drive signal that again comprises one or more drive pulses, now delivered to electrode b. The drive signal delivered to electrode b may be the same or different from that delivered previously to electrode a. For example, for reasons relating to touch panel losses explained above, the drive signal delivered to electrode b may have a smaller amplitude than that delivered to electrode a, due to electrode b's closer proximity to the ends of sense electrodes E1-E8 from which the response signals are derived (and thus lower losses). In any case, the drive signal delivered to electrode b causes sense unit S1 to generate a response signal whose amplitude is indicative of coupling capacitance C1b for the node E1/b, and sense unit S2 to generate a response signal whose amplitude is indicative of coupling capacitance C2b for the node E2/b, etc., and so on for the other sense units S3-S8 corresponding to nodes E3/*b* through E8/*b*, all at the same time. The presence or absence of peak detectors P1-P8, or of sample/hold buffers, or of low-pass filters discussed above in connection with the first phase of operation is equally applicable here. In any case, while the characteristic amplitude signals (e.g. peak amplitude or average amplitude of the response signals) are being delivered to the multiplexer 718, the controller 722 rapidly cycles the multiplexer 718 so that the ADC 720 first couples to peak detector P1 (if present, or to a low-pass filter, or to S1, for example) to measure the characteristic amplitude associated with node E1/*b*, then couples to peak detector P2 to measure the characteristic amplitude associated with node E2/*b*, and so forth, lastly coupling to peak detector P8 to measure the characteristic amplitude associated with node E8/*b*. As these characteristic amplitudes are measured, the values are stored in the controller 722. If the peak detectors include sample/hold buffers, the controller resets them after the measurements are made.

Two more phases of operation then follow in similar fashion, wherein a drive signal is delivered to electrode c and the characteristic amplitudes associated with nodes E1/*c* through E8/*c*, are measured and stored, and then a drive signal is delivered to electrode d and the characteristic amplitudes associated with nodes E1/*d* through E8/*d*, are measured and stored.

At this point, characteristic amplitudes of all of the nodes of the touch matrix have been measured and stored within a very short timeframe, e.g., in some cases less than 20 msec or less than 10 msec, for example. The controller 722 may then compare these amplitudes with reference amplitudes for each of the nodes to obtain comparison values (e.g., difference values) for each node. If the reference amplitudes are representative of a non-touch condition, then a difference value of zero for a given node is indicative of "no touch" occurring at such node. On the other hand, a significant difference value is representative of a touch (which may include a partial touch) at the node. The controller 722 may employ interpolation techniques in the event that neighboring nodes exhibit significant difference values, as mentioned above.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A touch-sensitive apparatus, comprising:
a panel comprising a touch surface and a plurality of electrodes defining an electrode matrix, the plurality of electrodes comprising a plurality of drive electrodes and a plurality of receive electrodes, each drive electrode being capacitively coupled to each receive electrode at a respective node of the matrix, the panel being configured such that a touch on the touch surface proximate a given one of the nodes changes a coupling capacitance between the drive electrode and the receive electrode associated with the given node;
a drive unit configured to generate a drive signal and to deliver the drive signal to the drive electrodes one at a time;
a sense unit configured to generate, for each drive signal delivered to each drive electrode, response signals for the plurality of receive electrodes, each of the response signals comprising a differentiated representation of the drive signal, an amplitude of each of the response signals being responsive to the coupling capacitance at the associated node; and
a measurement unit configured to measure the amplitude of each of the response signals for each of the nodes, and to determine therefrom the positions of multiple temporally overlapping touches, if present, on the touch surface, wherein the sense unit includes, for each of the receive electrodes, a peak detector configured to provide a peak detector output representative of a maximum amplitude of the respective response signal.

2. The apparatus of claim 1, wherein the drive unit includes a drive signal generator and a multiplexer, the drive signal generator being selectively couplable to a given one of the drive electrodes through the multiplexer.

3. The apparatus of claim 1, wherein the sense unit includes, for each of the receive electrodes, an operational amplifier having an inverting input coupled to the respective receive electrode.

4. The apparatus of claim 1, wherein the sense unit is further configured to maintain the receive electrodes at a fixed voltage.

5. The apparatus of claim 1, wherein the drive signal comprises a rectangle pulse.

6. The apparatus of claim 1, wherein each peak detector comprises a sample/hold buffer.

7. The apparatus of claim 1, wherein each peak detector comprises a diode coupled to a capacitor.

8. The apparatus of claim 7, wherein the sense unit includes, for each of the receive electrodes, a reset switch coupled to the respective capacitor and configured to discharge the respective capacitor in response to a reset signal.

9. The apparatus of claim 1, wherein the measurement unit comprises an analog-to-digital converter (ADC) and a multiplexer, the ADC coupling to the sense unit through the multiplexer.

10. The apparatus of claim 1, wherein the drive signal comprises a plurality of sequential pulses and each response signal comprises a corresponding plurality of response pulses, and wherein the measurement unit is configured to measure for each response signal an amplitude representative of amplitudes of the plurality of response pulses.

11. The apparatus of claim 10, wherein the measurement unit is configured to measure for each response signal a maximum one of the amplitudes of the plurality of response pulses.

12. The apparatus of claim 1, wherein the drive signal comprises a ramped pulse.

13. The apparatus of claim 12, wherein each response signal comprises a rectangle pulse.

14. The apparatus of claim 13, wherein the measurement unit comprises a low pass filter to smooth a plateau of the rectangle pulse.

15. The apparatus of claim 13, wherein the measurement unit comprises an analog-to-digital converter (ADC) and is adapted to couple each response signal to the ADC without passing the response signals through any peak detector.

16. The apparatus of claim 1, wherein the drive unit is configured to deliver a first drive signal to a first drive electrode and a second drive signal to a second drive electrode, and wherein the first drive signal has a signal amplitude that differs from that of the second drive signal.

17. The apparatus of claim 1, wherein the sense unit includes a first sense unit coupled to a first receive electrode and a second sense unit coupled to a second receive electrode, and wherein the first sense unit has an amplification associated therewith that differs from an amplification associated with the second sense unit.

18. The apparatus of claim 1, wherein the measurement unit additionally includes a differential amplifier configured to reduce or eliminate common mode noise.

19. A touch-sensitive apparatus, comprising:

a panel comprising a touch surface and a plurality of electrodes defining an electrode matrix, the electrode matrix being configured such that a touch on the touch surface proximate a given node of the matrix changes a coupling capacitance between two of the electrodes;

a drive unit coupled to the electrode matrix and configured to generate a drive signal comprising one or more ramped pulses;

a sense unit coupled to the electrode matrix and configured to generate, in response to the drive signal, at least one response signal that includes one or more rectangle pulses, an amplitude of the at least one response signal being responsive to a touch on the touch surface, wherein the sense unit includes at least one peak detector configured to provide a peak detector output representative of a maximum amplitude of the at least one response signal.

\* \* \* \* \*